United States Patent [19]
Wu

[11] 3,789,287
[45] Jan. 29, 1974

[54] VOLTAGE REGULATING DEVICE FOR VEHICLES

[76] Inventor: Te-Hsiung Wu, No. 68 Lin Chiang St., Taeipei, China /Taiwan

[22] Filed: May 19, 1972

[21] Appl. No.: 255,044

[52] U.S. Cl. ................... 320/48, 320/64, 322/28
[51] Int. Cl. ............................................ H02j 7/14
[58] Field of Search ....... 320/61, 64, 48; 322/28, 99

[56] References Cited
UNITED STATES PATENTS

| | | | |
|---|---|---|---|
| 3,496,443 | 2/1970 | Snedecker et al. ................ | 320/48 X |
| 3,617,853 | 11/1971 | Kawashima ...................... | 320/48 X |
| 3,515,978 | 6/1970 | Williams et al. .................. | 320/64 X |
| 3,336,519 | 8/1967 | Grimm ............................ | 320/61 X |
| 3,593,102 | 7/1971 | Kawashima et al. .............. | 320/64 |

Primary Examiner—James D. Trammell
Assistant Examiner—Robert J. Hickey
Attorney, Agent, or Firm—Moonray Kojima

[57] ABSTRACT

Voltage regulating circuit for use in vehicles comprising a zener diode circuit which monitors the voltage of a battery and when above a certain level stops energization of a field winding of a generator to thereby stop charging, and when below a certain level causes one or more transistors to cause energization of the field winding and consequent charging of the battery.

1 Claim, 3 Drawing Figures

VOLTAGE REGULATING DEVICE FOR VEHICLES

BACKGROUND OF INVENTION

This invention relates to a voltage regulating device for vehicles, and more particularly to a non-contacting type of battery charging voltage regulator for vehicles.

In the prior art, a battery charging circuit for vehicles comprises a pair of voltages sensing devices or relays. One circuit is actuated to indicate the status of charging. The other circuit senses the voltage level of the charging battery to disconnect the exciting current of the field winding of the generator. In the usual manner, the power of the battery is continuously consumed. The terminal voltage of the battery is thereby reduced. As soon as the voltage of the battery is reduced to a predetermined level, a pair of relays will be actuated to excite the field winding of a generator until the voltage of the battery increases to the predetermined level.

In this manner, the relays will be constantly energized and their associated platinum contacts would thus be made and broken frequently. The application of supply voltage and self induced voltage of the field winding may cause the contacting surfaces of the contacts to become damaged due to the formation of high temperature arcs therebetween. As a result, the contacts are normally used under up, down vibration condition. They must be cleaned or replaced with new ones with great frequency.

Furthermore, the differential voltage which the relays operate or pull in and release or drop out usually reaches high levels, such as ± 2 volts. In fairly frequent cases, the battery is used under conditions of overcharging and over discharging. The life of the battery thus is adversely affected.

Although transistor circuits have been used in voltage regulators to replace the conventional contacting type of voltage regulator, the performance of the regulator is found to be unsatisfactory, because the operational sensitivity has not yet been improved.

SUMMARY OF INVENTION

It is an object of the invention to provide a novel non-contacting type of voltage regulator for vehicle with high sensitivity of differential operational voltage in the amount of ± 0.15 volts.

It is another object to provide a non-contacting voltage regulator which eliminates frequent requirement of adjustment of the gap between contacts, or cleaning the surface of such contacts.

Another object is to improve the performance of charging and discharging of batteries for vehicles and thereby extend the life, reduce the maintenance cost of such batteries and associated electrical circuits.

A further object is to provide a solid state voltage regulator device with a substantially constant voltage for its load circuit thereby to reduce the burden of the rectifier and the field winding of a generator and to increase its life.

The invention encompasses a sensing circuit employing a zener diode to monitor the voltage of a battery and when the voltage is above a certain level, no current is applied to the field winding of a generator and there is no charging. When the voltage is below that level, transistors are energized to excite the field winding and the battery is thus charged.

DETAILED DESCRIPTION OF PREFERRED EMBODIMENTS

Figure 1:
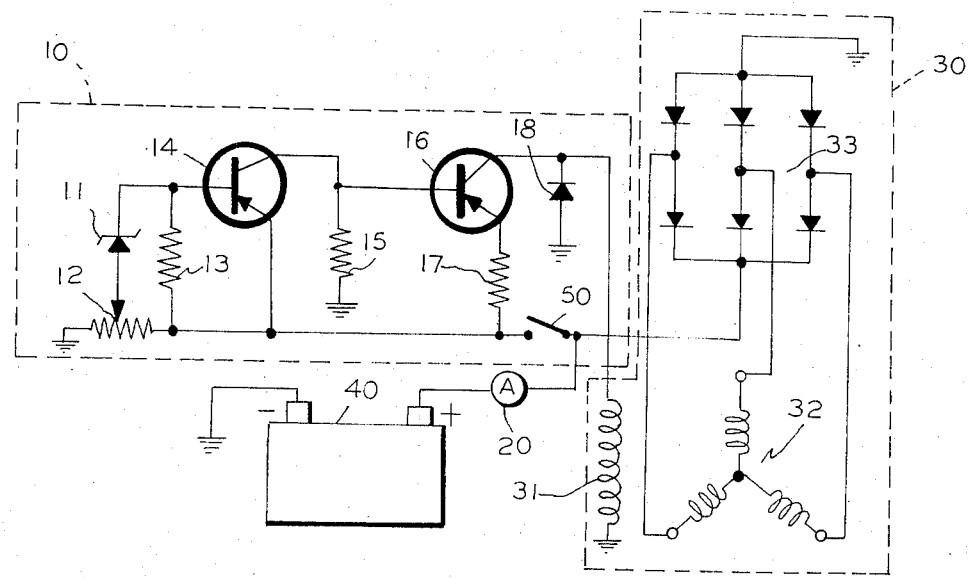
FIG. 1 depicts a circuit diagram of an illustrative embodiment of the invention.
Figure 2:
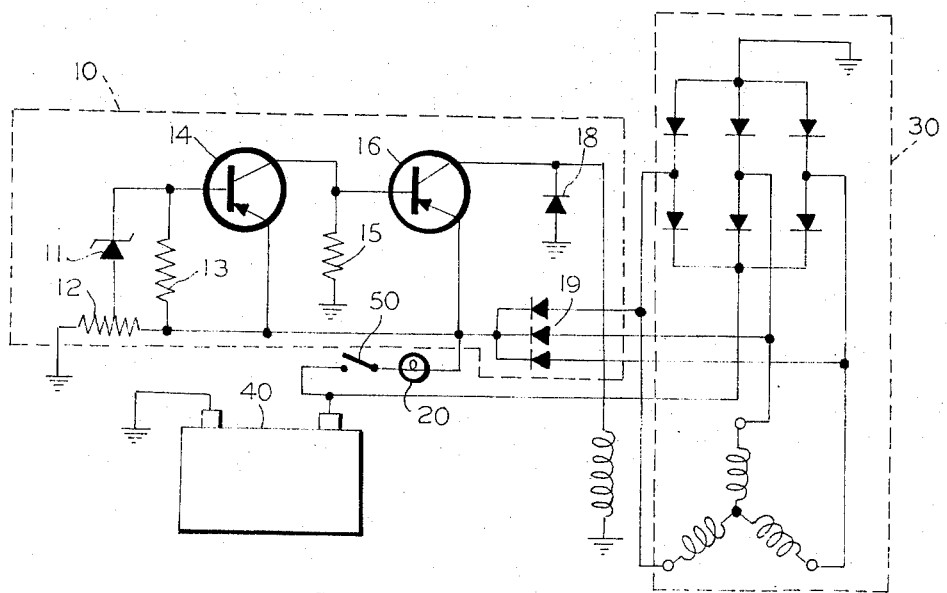
FIG. 2 depicts a circuit diagram of another illustrative embodiment of the invention.
Figure 3:
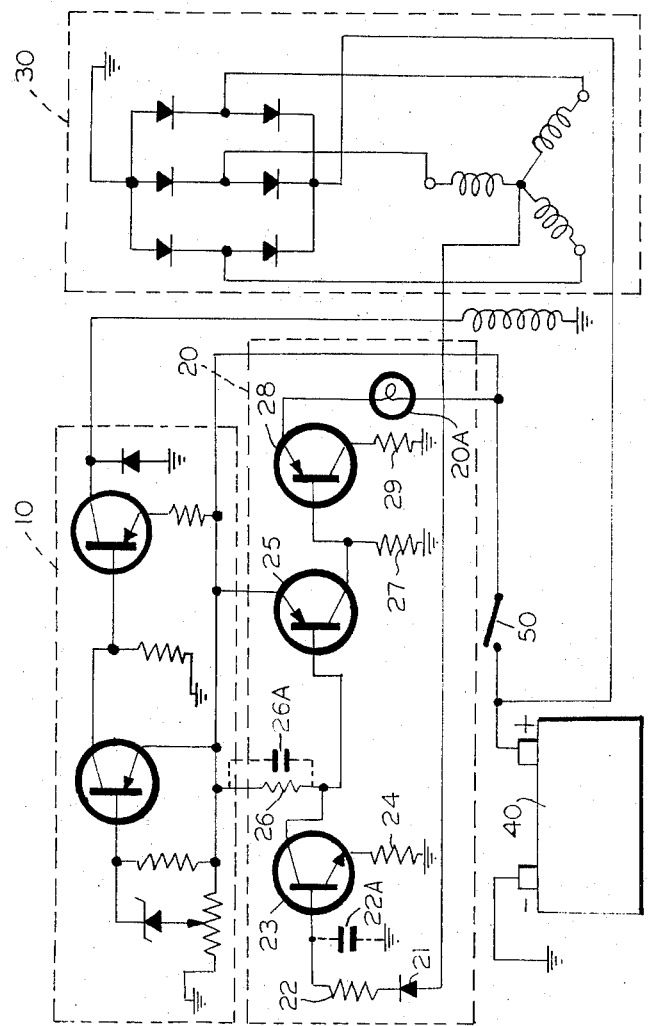
FIG. 3 depicts a circuit diagram of a further illustrative embodiment of the invention.

In FIGS. 1 through 3, the same reference numerals or symbols designate the same or corresponding elements. In these figures there are depicted transistor circuit 10 of exciting device for generator, comprising a zener diode 11 for sensing the voltage level of battery 40, transistor 14 and 16. An indicating means 20, in FIG. 1, is an ammeter for indicating the status of the current charging battery 40. A generator 30 is shown comprising a field winding 31, armature 32 and rectifier 33.

In operation, as the vehicle is ready for use, switch 50 is switched on. If the voltage of battery 40 is above a predetermined level, the voltage is sensed by a voltage comparing circuit comprising zener diode 11, resistor $R_{13}$ and variable resistor 12, does not cause the base current to energize transistor 14. Thus, no current is supplied to excite field winding 31 of generator 30. As soon as the voltage of the battery is below the predetermined level, the voltage comparison circuit senses a potential. By this potential, the base current of transistor 14 will be increased to bring itself into a conduction state. The bias voltage of transistor 16 is thus established and the field winding 31 of generator 30 is excited through the circuit comprising positive terminal of battery 40, ammeter A, switch 50, resistor 17, transistor 16, field winding 31 and negative terminal of battery 40.

The voltage generated by generator 30 is charged to the terminals of the battery through rectifier 33 and ammeter 20. Transitors 14 and 16 will thus continue to be energized and will not change their state until the voltage of battery increases to the predetermined level, for example 14.2 volts. In particular, as long as the voltage of battery 40 comes down to 14.2 volts, such level of voltage will be sensed by zener diode 11. Because the terminal voltage of zener diode 11 is kept constant in conjunction with the voltage drop across resistor 13, the resultant voltage applied to the base of transistor 14 is about ± 0.15 volts. Thus, the transistor 14 is energized with a small amount of voltage variation. The voltage regulator thus provides high sensitivity with simple circuitry. Such sensitivity is an important feature and advantage of this invention.

Referring to FIG. 2, there is shown a second embodiment of this invention. The circuitry is similar to the embodiment of FIG. 1, except the indicating means 20 is substituted by indicating lamp 20, whereby the exciting source is applied to field winding 31 through rectifier unit 19 and transistor 16, while voltage generated in the generator is charged to battery 40 through the rectifier unit 33. As soon as the field winding 31 is excited during voltage generation, lamp 20 will go "off" to indicate normal status of charging. If no current is applied to field winding 31, that is to say, the voltage of battery 40 increases to the predetermined level, transistor 16 changes its state and interrupts the circuit of the exciting source. However, if lamp 20 suddenly goes "on" while the vehicle is running, it indicates that the generator 30 has failed or is in an abnormal state.

The third embodiment is shown in FIG. 3 wherein indicating means 20 is shown modified by employing a transistor 23,25,28 as switching means for lamp 20A. In this embodiment, the neutral line of armature 32 is connected to the base of transistor 23 through diode 21, resistor 22. Transistor 23 is a NPN type and its collector is directly connected to the base of transistor 25. The collector of transistor 28 is grounded through resistor 29, while its emitter is connected to the positive terminal of battery 40 through lamp 20A and switch 50.

In operation, if voltage of battery 40 is below a predetermined level, switching on switch 50 will cause the exciting current from battery 40 to be supplied to field winding 31 through the above mentioned circuit, whereupon the voltage generated from the neutral point is applied to the base of transistor 23 through diode 21 and resistor 22. The conduction of transistor 23 will bring transistor 25 into energization. This will cause transistor 28 to be de-energized. Therefore, lamp 20A will be turned "off" to indicate that voltage generated in generator 30 is normally charging battery 40. Lamp 20A will not go "on" until generator 30 fails (such as no voltage is generated from its armature) except switch 50 is switched on in case of parking.

It is to be appreciated that capacitors 26A and 22A shown in dotted lines may be added to the charge indicating circuit to improve brightness of lamp 20A. Diode 29A may also be connected to the emitter of transistor 28 for protection of transistor 28. Of course, these elements are not essential to the present invention, but do contribute to its enhancement.

As is apparent from the foregoing specification, the invention which encompasses a voltage regulating for use in vehicles is entirely free from troubles resulting from unsatisfactory contacts, and advantageously is capable of high sensitivity. Thus, this invention is highly durable, and practically maintenance free. It enables the voltage of the battery to be maintained in a constant level and thereby extends the life thereof and also extends the life of the generator.

The fogoing description is intended to be only illustrative of the principles of this invention. Numerous variations and modifications thereof would be apparent to one skilled in the art. All such variations and modifications are to be considered to be within the spirit and scope of the invention.

What is claimed is:

1. A voltage regulating device useable in combination with a generator, said generator having armature windings and field windings, rectifier, and a battery; said device comprising a Zener diode having two terminals; a variable resistor having two end terminals and a variable terminal; a first resistor; a first transistor having base, collector and emitter electrodes; a second transistor having base, collector and emitter electrodes; a second and a third resistor; indicator means; means for connecting one terminal of said Zener diode to said variable terminal of said variable resistor and for connecting the other terminal of said Zener diode and one terminal of said first resistor to said base of said first transistor and one terminal of said variable resistor connected with the other terminal of said first resistor; means for connecting said collector electrode of said first transistor respectively to one terminal of said second resistor and directly to said base electrode of said second transistor; means for connecting said collector of said second transistor and one terminal of said first diode to one terminal of said field windings of said generator and connecting said emitter of second transistor to one terminal of third resistor, said one terminal of said variable resistor, said emitter of said first transistor and the other terminal of said third resistor connected to one terminal of said battery through said indicating means and a switch and to said armature windings of said generator through rectifying means, respectively, the other terminal of said variable resistor, the other terminals of said second resistor, said first diode and said field windings of said generator connected to the other terminal of said battery, whereby said Zener diode, said first resistor and said variable resistor monitoring the voltage of said battery and causing a sufficient bias to cause said first transistor to conduct when said voltage is below a predetermined level and thereby to cause said second transistor to conduct and cause excitation of said field windings and actuation of said indicator means, and when said voltage is above said predetermined level to cause said first transistor to be non-conductive and said second transistor to be non-conductive thereby to remove current from said field windings; said indicating means comprising a third transistor having its base connected to the neutral point of said armature winding of said generator through a second diode and a fourth resistor, its emitter connected to a fifth resistor and its collector respectively connected to one terminal of a sixth resistor and directly to the base of a fourth transistor, said fourth transistor having a collector respectively connected to a seventh resistor and directly to a base of a fifth transistor, said fifth transistor having its collector connected with an eighth resistor and its emitter connected to one terminal of a indicating lamp, the other terminal of said sixth resistor, an emitter of said fourth transistor, the other terminal of said indicating lamp all connected to one terminal of said battery through a switch, the other terminal of said fifth resistor, seventh resistor and eighth resistor directly connected to the other terminal of said battery.

* * * * *